United States Patent
Chang et al.

(10) Patent No.: US 7,534,410 B1
(45) Date of Patent: May 19, 2009

(54) METHOD FOR MAKING SILICA NANOPARTICLES BY FLAME SPRAY PYROLYSIS ADOPTING TWO-FLUID NOZZLE

(75) Inventors: Han Kwon Chang, Daejeon (KR); Hee Dong Jang, Daejeon (KR)

(73) Assignee: Korea Institute of Geoscience & Mineral Resources (KIGAM), Daejeon (KR)

( * ) Notice: Subject to any disclaimer, the term of this patent is extended or adjusted under 35 U.S.C. 154(b) by 312 days.

(21) Appl. No.: 11/530,831

(22) Filed: Sep. 11, 2006

(30) Foreign Application Priority Data

Mar. 28, 2006 (KR) .................. 10-2006-0027704

(51) Int. Cl.
- *C01B 33/12* (2006.01)
- *C01B 33/18* (2006.01)
- *B82B 3/00* (2006.01)

(52) U.S. Cl. .................. 423/335; 423/336; 423/337; 977/840; 977/895; 977/896

(58) Field of Classification Search .................. 423/335, 423/336, 337; 977/840, 895, 896
See application file for complete search history.

(56) References Cited

U.S. PATENT DOCUMENTS

| | | | |
|---|---|---|---|
| 5,580,655 A | 12/1996 | El-Shall et al. | |
| 5,770,022 A | 6/1998 | Chang et al. | |
| 6,322,765 B1 | 11/2001 | Muhlhofer et al. | |
| 6,386,373 B1 | 5/2002 | Jourdier et al. | |
| 6,698,247 B2 | 3/2004 | Tennent et al. | |

FOREIGN PATENT DOCUMENTS

KR          10-0076844          *   9/2004

OTHER PUBLICATIONS

L. Maedler et al., Controlled synthesis of nanostructured particles by flame spray pyrolysis, 2002, Journal of Aerosol Science, 33, p. 369-389.*

Hee Dong Jang, Experimental study of synthesis of silica nanoparticles by a bench-scale diffusion flame reactor, 2001, Powder Technology, 119, p. 102-108.*

* cited by examiner

*Primary Examiner*—Timothy C Vanoy
*Assistant Examiner*—Serena L Hanor
(74) *Attorney, Agent, or Firm*—Abelman Frayne & Schwab; Harry K. Ahn (57) ABSTRACT

The invention relates to a method for making silica nanoparticles using a flame reactor, which includes a droplet spray having a two-fluid nozzle and a burner of a quintuple tube structure. In this method, droplets of silicon alkoxide as liquid Si compound are sprayed through the droplet spray of the flame reactor. A flame is generated by the flow of inert gas, oxygen, hydrogen and air simultaneously into the burner of the flame reactor. The liquid Si compound is delivered through the flame of the burner to produce silica nanoparticles having a mean particle size ranging from 9 nm to 68 nm. Resultant nanoparticles are collected and recovered in a particle collector. The droplets sprayed under high pressure from a silicon alkoxide solution are directly oxidized in the flame, thereby producing spherical silica nanoparticles.

14 Claims, 6 Drawing Sheets

METHOD FOR MAKING SILICA NANOPARTICLES BY FLAME SPRAY PYROLYSIS ADOPTING TWO-FLUID NOZZLE

BACKGROUND OF THE INVENTION

1. Field of the Invention

The present invention relates to a method for making nanoparticles, and more particularly to a method for making silica nanoparticles by flame spray pyrolysis adopting a two-fluid nozzle, which sprays droplets under high pressure from a silicon alkoxide solution to directly oxidize in a flame thereby producing spherical silica nanoparticles.

2. Description of the Prior Art

In general, nanoparticles refer to particles having a size 100 nm or less, which are mainly used as advanced materials due to high specific area per mass and novel functions.

Silica ($SiO_2$) particles are adopted in various applications such as fillers of Epoxy display and semiconductor Molding Compound (EMC), fillers of cosmetics and copy machine toner, components of paint and ink for improving endurance and inducing diffused reflection, raw materials of optical fibers, ceramic ware and glasses.

Examples of technologies for making such silica particles are known from U.S. Pat. No. 6,322,765, titled *"Process for preparing silicon dioxide"*, filed Sep. 8, 1998; U.S. Pat. No. 6,386,373, titled *"Process for making silica powder and use of such powder in the manufacture of an optical fiber preform"*, filed Mar. 10, 2000; U.S. Pat. No. 6,698,247, titled *"Method and feedstock for making silica by flame combustion"*, filed May 4, 2001; Korean Patent No. 10-0354432, titled *"Method for making spherical silica particles by spray pyrolysis"*, filed Jul. 12, 2000; Korean Patent No. 10-0468050, titled *"Method for making spherical silica powder"*, filed Dec. 4, 2001; Korean Patent No. 10-0503675, titled *"Method for making high purity silica"*, filed Mar. 9, 2002; and Korean Patent No. 10-0477200, titled *"Method for making silica particles by supersonic spray pyrolysis"*, filed Jun. 5, 2002.

To be used in advanced material fields such as semiconductor fields which require high integration, small size and thickness reduction, silica particles should be produced in nanosize and maintain a spherical geometry to obtain high filling density.

To make silica nanoparticles, many researchers have developed physical/chemical approaches. Examples of such approaches are known from U.S. Pat. No. 5,580,655, titled *"Silica nanoparticles"*, filed Mar. 3, 1995; U.S. Pat. No. 5,770,022, titled *"Method of making silica nanoparticles"*, filed Jun. 5, 1997; and Korean Patent No. 10-0330626, filed *"Method for making nanosize silica fine particles"*, filed Mar. 7, 2000.

U.S. Pat. No. 5,580,655 relates to a method for vaporizing Si metal with a pulse laser to react with oxygen in order to produce silica nanoparticles. However, pulse laser method shows a low yield of silica nanoparticles, and thus is hardly applicable in the industry.

U.S. Pat. No. 5,770,022 relates to a method for synthesizing silica, in which a direct current discharge is performed with an anode of Si and a cathode of Cu or W to generate plasma in an oxygen atmosphere so that Si in the anode is vaporized and oxidized to synthesize silica. Korean Patent No. 10-0330626 relates to a method for synthesizing silica nanoparticles, in which an evaporator vaporizes source material for silica such as silicon alkoxide, which is then supplied to a flame reactor to be synthesized into silica nanoparticles through Chemical Vapor Deposition (CVD).

According to these methods, however, a large amount of energy is consumed and it is difficult to make spherical silica nanoparticles since source material such as Si metal or silicon alkoxide compound is vaporized and oxidized to produce silica nanoparticles.

SUMMARY OF THE INVENTION

Accordingly, the present invention has been made to solve the above-mentioned problems occurring in the prior art, and an object of the present invention is to provide a method for making silica nanoparticles by flame spray pyrolysis adopting a two-fluid nozzle, which sprays droplets under high pressure from a silicon alkoxide solution to directly oxidize in a flame thereby producing spherical silica nanoparticles.

In order to accomplish this object, there is provided a method for making silica nanoparticles using a flame reactor, which includes a droplet spray having a two-fluid nozzle and a burner of a quintuple tube structure, the method comprising steps of: spraying droplets of silicon alkoxide as liquid Si compound through the droplet spray of the flame reactor; generating a flame by the flow of insert gas, oxygen, hydrogen and air simultaneously into the burner of the flame reactor; delivering the liquid Si compound through the flame of the burner to produce silica nanoparticles having a mean particle size ranging from 9 nm to 68 nm; and collecting and recovering resultant nanoparticles in a particle collector.

Here, the droplet spray is inserted into an innermost first tube of quintuple tubes of the burner, and dispersed air at 1% to 3% in volume of the entire flow rate of gas is blown into the droplet spray, by which silicon alkoxide introduced into the droplet spray is sprayed in the form of fine droplets under high pressure, Ar gas at 7% to 8% in volume of the entire flow rate of gas is blown into the second tube, hydrogen gas at 3% to 13% in volume of the entire flow rate of gas is blown into the third tube, oxygen gas at 21% to 23% in volume of the entire flow rate of gas is blown into the fourth tube, and air at 53% to 62% in volume of the entire flow rate of gas is blown into the fifth tube.

Preferably, the input of silicon alkoxide is varied from $2.1 \times 10$ mol/l to $8.7 \times 10^{-4}$ mol/l to control the mean size of the silica nanoparticles.

Preferably, the dispersed air is varied from 1.0 kgf/cm$^2$ to 5.0 kgf/cm$^2$ to control the mean size of the silica nanoparticles.

Preferably, the silicon alkoxide is pretreated through thinning with ethanol or methanol prior to being sprayed by the droplet spray.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

In the following description and drawings, the same reference numerals are used to designate the same or similar components, and so repetition of the description on the same or similar components will be omitted. The following terminologies used in view of the functions may be construed differently according to users, operator's intention and practices. Accordingly, such terminologies should be defined based on the general concept disclosed herein.

An apparatus for making silica nanoparticles by flame spray pyrolysis adopting a two-fluid nozzle according to the invention will now be described in detail with reference to the accompanying drawings.

Figure 1:
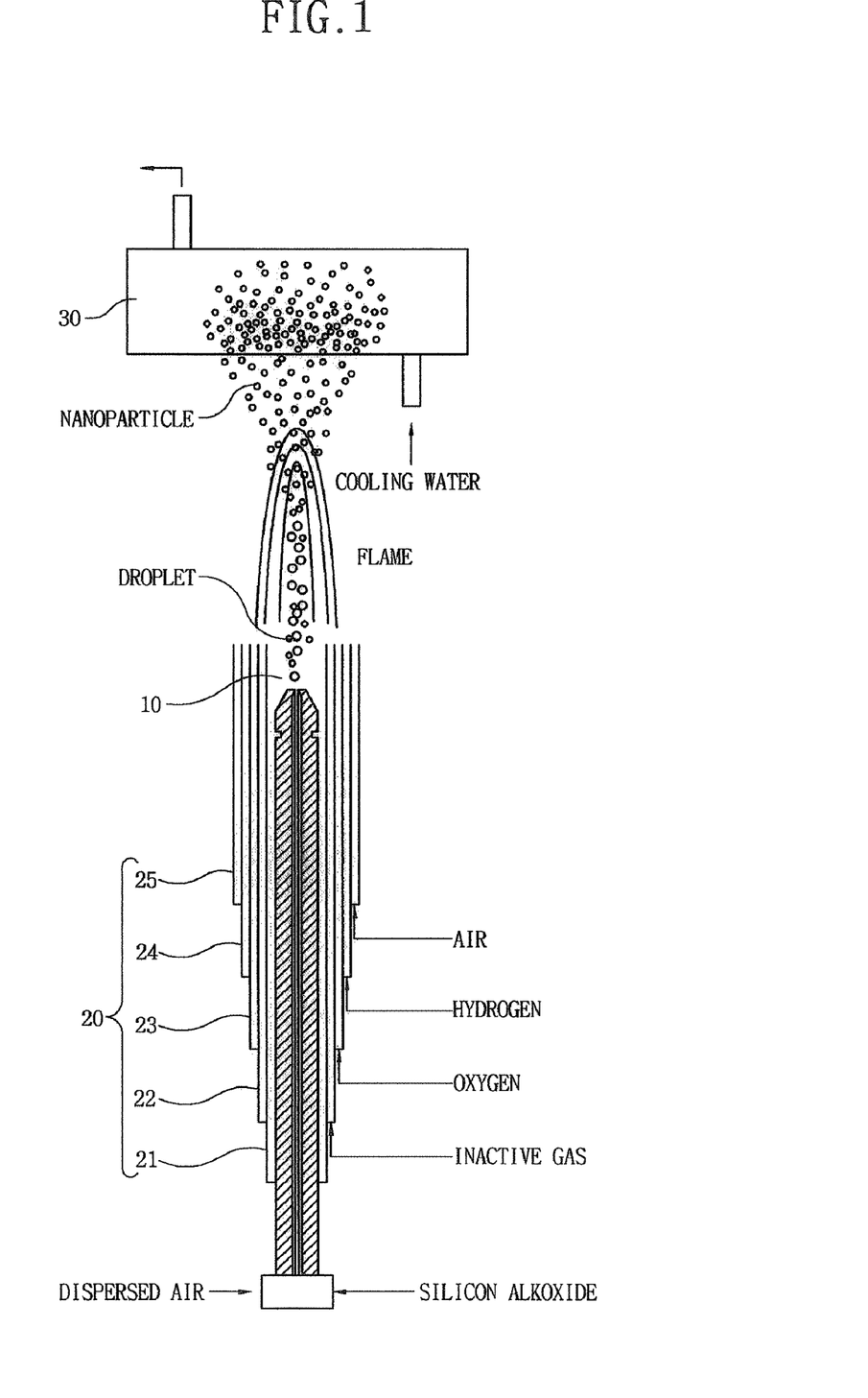
FIG. 1 is a schematic view illustrating an apparatus for making nanoparticles according to the invention.
Figure 2:
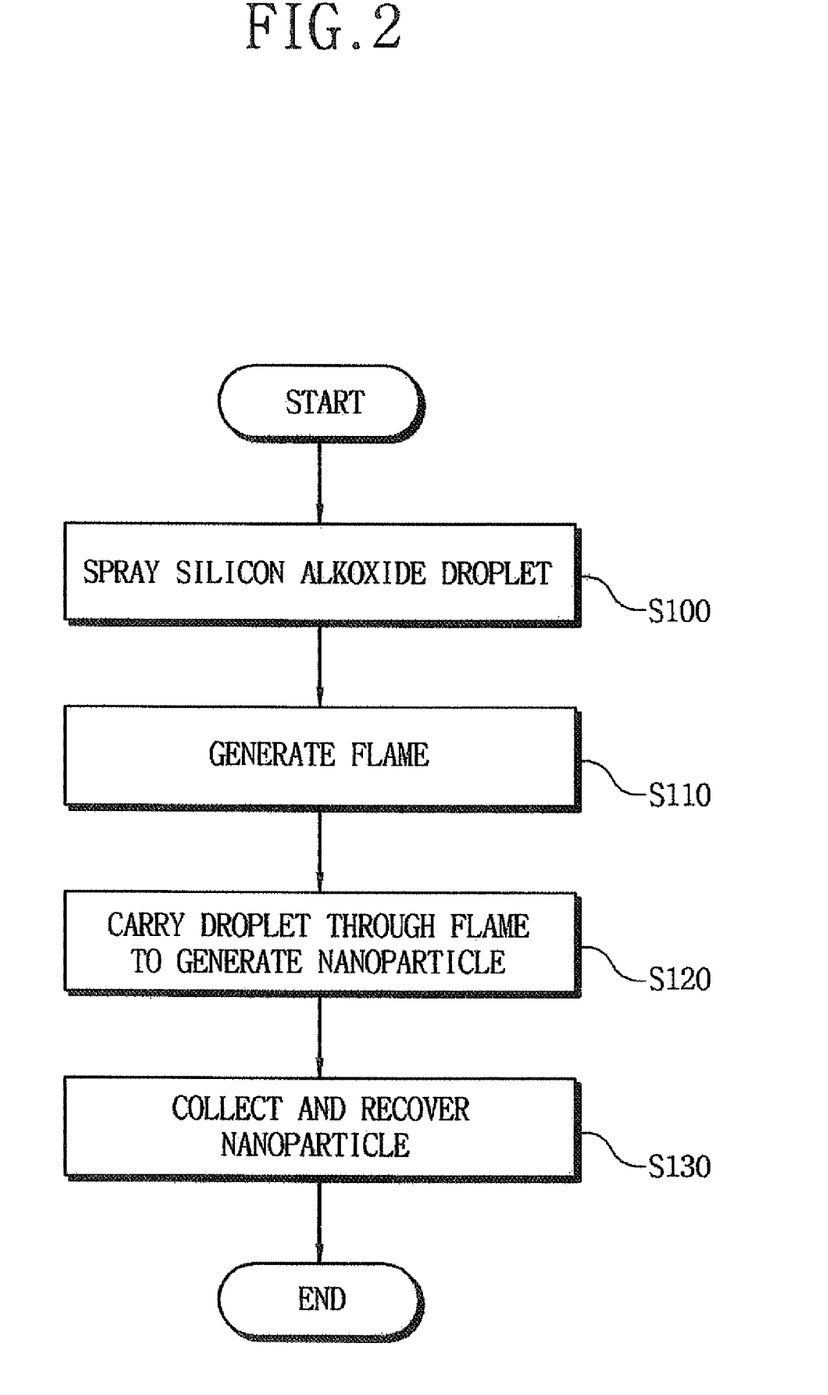
FIG. 2 is a flowchart illustrating a process for making silica nanoparticles by flame spray pyrolysis adopting a two-fluid nozzle according to the invention.
Figure 3:
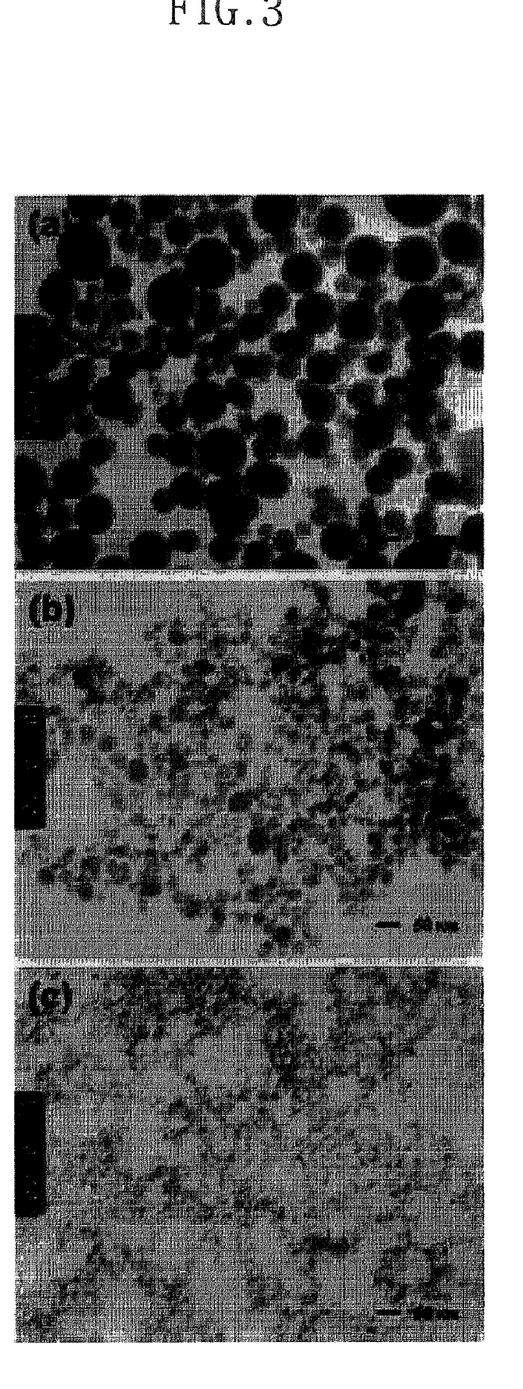
FIG. 3 illustrates photomicrographs of several types of silica nanoparticles produced by varying the pressure of diffused air according to the invention.
Figure 4:
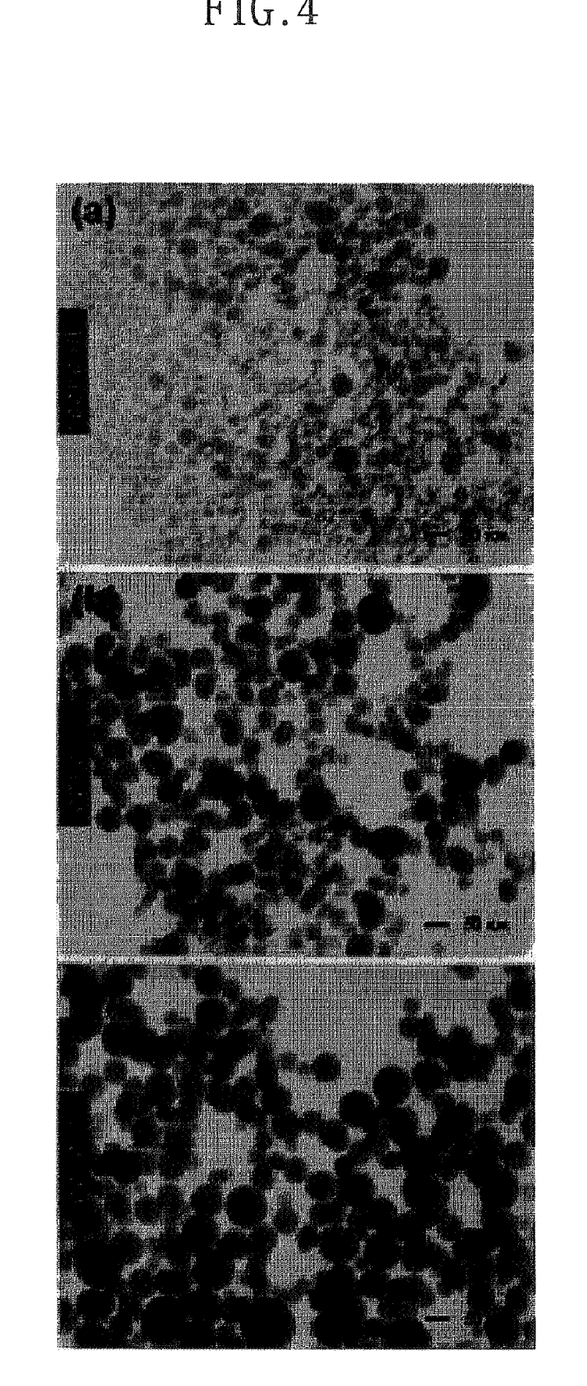
FIG. 4 illustrates photomicrographs of several types of silica nanoparticles produced by varying the input of a reactive material according to the invention.
Figure 5:
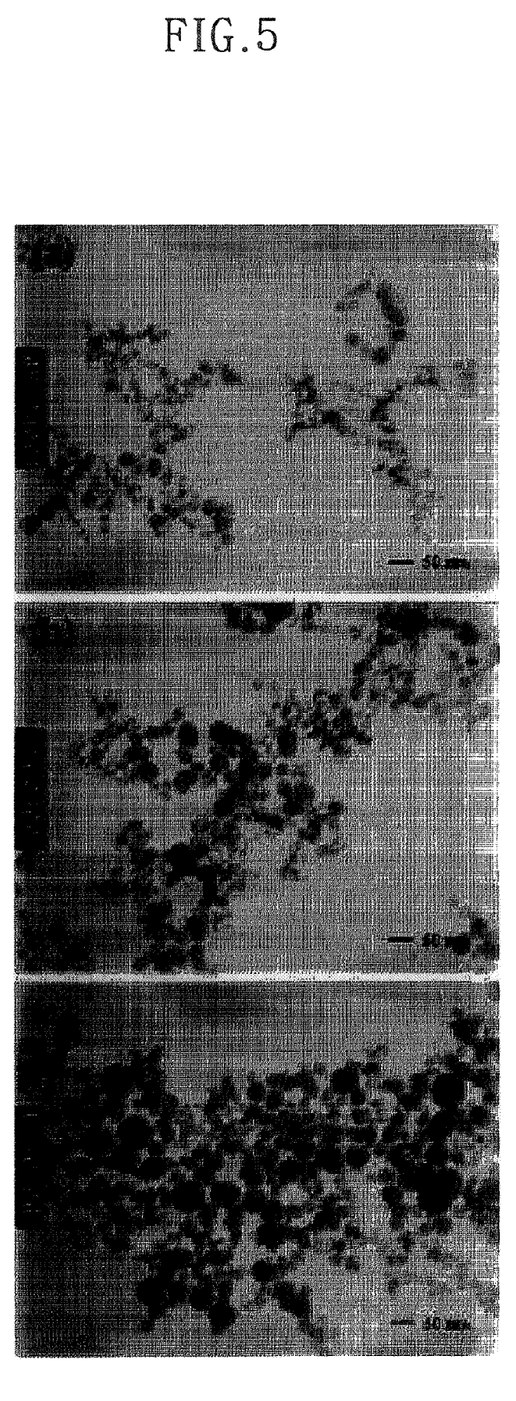
FIG. 5 illustrates photomicrographs of several types of silica nanoparticles produced by varying the input of a reactive solution with hydrogen gas content of 3% in volume of the entire gas according to the invention.
Figure 6:
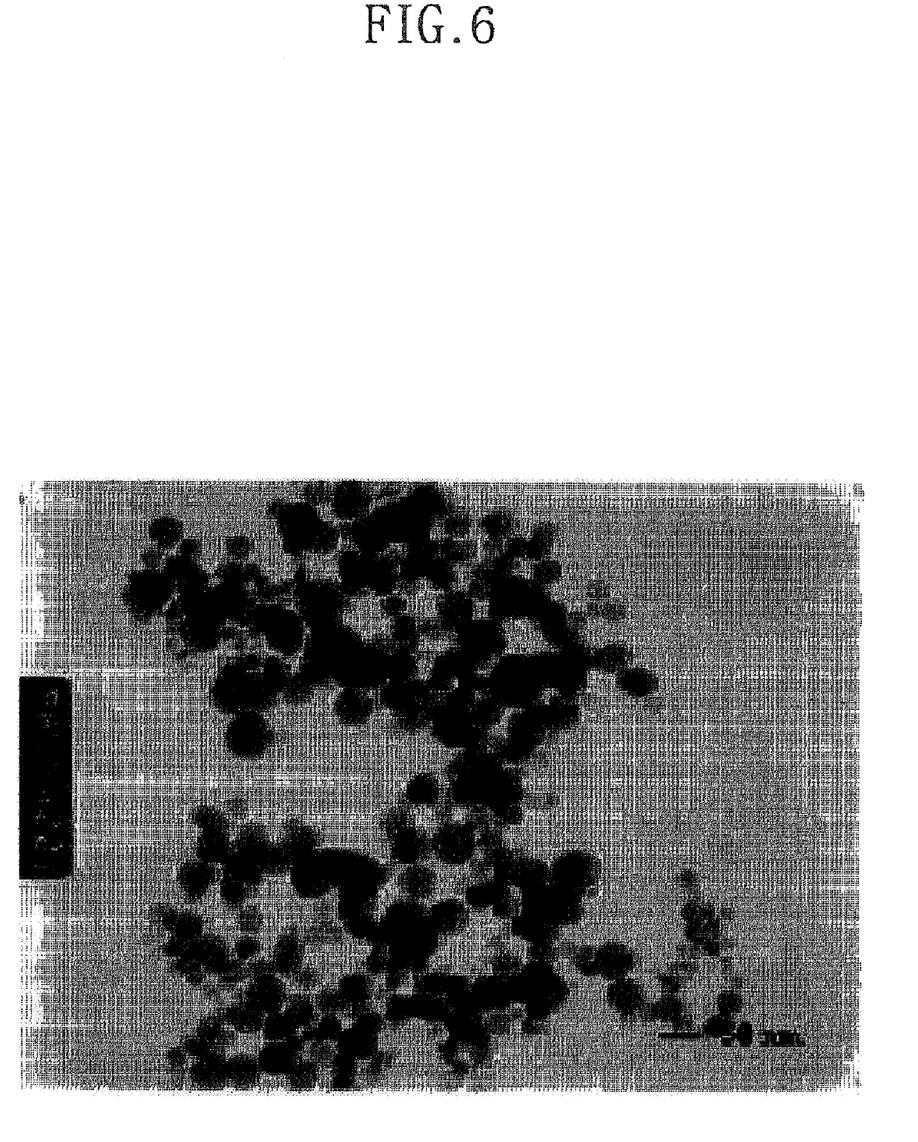
FIG. 6 illustrates a photomicrograph of silica nanoparticles produced by substituting TMOS for a reactive material according to the invention.

In the drawings, FIG. 1 is a schematic view illustrating an apparatus for making nanoparticles according to the invention, FIG. 2 is a flowchart illustrating a process for making silica nanoparticles by flame spray pyrolysis adopting a two-fluid nozzle according to the invention, FIG. 3 illustrates photomicrographs of several types of silica nanoparticles produced by varying the pressure of diffused air according to the invention, FIG. 4 illustrates photomicrographs of several types of silica nanoparticles produced by varying the input of a reactive material according to the invention, FIG. 5 illustrates photomicrographs of several types of silica nanoparticles produced by varying the input of a reactive solution with hydrogen gas content of 3% in volume of the entire gas according to the invention, and FIG. 6 illustrates a photomicrograph of silica nanoparticles produced by substituting TMOS for a reactive material according to the invention.

Referring to FIG. 1 first, the apparatus for making nanoparticles according to the invention includes a flame reactor and a particle collector 30.

The flame reactor includes a droplet spray 10 having a two-fluid nozzle and a burner 20 of a quintuple tube structure including five tubes 21 to 25. The droplet spray 10 having a two-fluid nozzle is inserted into the innermost first tube 21, and dispersed air is blown into the droplet spray 10. In addition, inert gas, oxygen, hydrogen and air are blown in their order to the second to fifth tubes 22 to 25, respectively.

The dust collector 30 collects nanoparticles produced through the flame of the burner 20, and cooling water is flown into the dust collector 30.

Now a process for making silica nanoparticles by flame spray pyrolysis adopting a two-fluid nozzle according to the invention will be described in detail with reference to the accompanying drawings.

The process includes steps of spraying droplets of silicon alkoxide as liquid Si compound through the droplet spray 10 having a two-fluid nozzle of the flame reactor (S100), generating a flame by the flow of inert gas, oxygen, hydrogen and air simultaneously into the burner 20 of the flame reactor (S110), delivering the liquid Si compound through the flame of the burner 20 to produce silica nanoparticles having a mean particle size ranging from 9 nm to 68 nm (S120), and collecting and recovering the resultant nanoparticles in the particle collector 30 (S130). Here, silicon alkoxide comprises tetraethylorthosilicate (TEOS) or tetramethylorthosilicate (TMOS).

In the meantime, the droplet spray 10 having a two-fluid nozzle is inserted into the innermost first tube 21 of the quintuple tubes 21 to 25. Dispersed air occupying 1% to 3% in volume of the entire flow rate of gas is blown into the droplet spray 10, by which silicon alkoxide introduced into the droplet spray 10 is sprayed in the form of fine droplets under high pressure. Ar gas at 7% to 8% in volume of the entire flow rate of gas is blown into the second tube 22, hydrogen gas at 3% to 13% in volume of the entire flow rate of gas is blown into the third tube 23, oxygen gas at 21% to 23% in volume of the entire flow rate of gas is blown into the fourth tube 24, and air at 53% to 62% in volume of the entire flow rate of gas is blown into the fifth tube 25.

In addition, the amount of silicon alkoxide is varied in the range from $2.1 \times 10$ mol/l to $8.7 \times 10^{-4}$ mol/l of the entire flow rage of gas to control the mean particle size of the silica nanoparticles.

The pressure of dispersed air is varied in the range from 1.0 $kgf/cm^2$ to 5.0 $kgf/cm^2$ to control the mean particle size of the silica nanoparticles.

Silica alkoxide is pretreated through thinning with ethanol or methanol prior to being sprayed by the droplet spray having a two-fluid nozzle.

Now examples of a process for making silica nanoparticles by flame spray pyrolysis adopting a two-fluid nozzle according to the invention will be described in detail with reference to the accompanying drawings.

EXAMPLE 1

Example 1 was aimed to adjust the size of resultant particles by varying the pressure of dispersed air for micronizing liquid source material during the production of nanoparticles.

An experiment was carried out to make silica nanoparticles, in which silicon alkoxide (TEOS) mixed with ethanol were delivered through a flame under the following conditions.

A liquid sample or TEOS was injected into the droplet spray 10 as shown in FIG. 1, where it was liquefied with dispersed air under high pressure. Then, the liquefied TEOS was flown into the first tube 21 in the center of the burner 20, and Ar, H, oxygen and air were blown respectively in their order into the second to fifth tubes 22 to 23 of the dispersion type burner 20, thereby producing flame.

Describing the flow rate of gas introduced into the flame reactor, dispersed air was blown into the first tube 21 of the burner 20 having the first to fifth tubes 21 to 25, at a volume fraction of 2% to 3% in the entire flow rate of gas with varying pressures of 1.0 $kgf/cm^2$, 3.0 $kgf/cm^2$ and 5.0 $kgf/cm^2$, in order to make the TEOS reactive material into fine droplets having a molarity of $2.1 \times 10^{-4}$ mol/l. In addition, Ar gas at 7% in volume fraction was blown into the second tube 22, hydrogen gas at 14% in volume fraction was blown into the third tube 23, oxygen gas at 21% in volume fraction was blown into the fourth tube 24, and air at 55% to 56% in volume fraction was blown into the fifth tube 25.

FIG. 3 illustrates Transmission Electron Microscope (TEM) photographs of nanoparticles produced under the above experimental conditions where the pressure of dispersed air had different values of (a) 1.0 $kgf/cm^2$, (b) 3.0 $kgf/cm^2$ and (c) 5.0 $kgf/cm^2$. Referring to FIG. 3, it is apparent that all types of particles in (a) to (c) show a substantially spherical geometry and the particle size decreases as the pressure of dispersed air increases.

Changes in the specific surface area and particle size of resultant particles were examined with a specific surface area analyzer (BET method). The specific area increased from 40 m²/g to 113 m²/g and 318 m²/g as the pressure of dispersed air was raised from 1.0 kgf/cm² to 3.0 kgf/cm² and 5.0 kgf/cm². The mean size of particles was decreased from 68 nm to 24 nm and 9 nm when calculated from a conversion formula $d_p=6/(\rho_p \cdot A)$, where $d_p$ is particle size, $\rho_p$ is silica density, and A is specific surface area.

EXAMPLE 2

Example 2 was aimed to adjust the size of resultant particles by injecting a reactive material into a hot flame with different concentrations of $2.1 \times 10^{-4}$ mol/l, $3.3 \times 10^{-4}$ mol/l and $4.8 \times 10^{-4}$ mol/l while maintaining constantly the pressure of dispersed air for micronizing liquid source material during the production of nanoparticles.

Describing the flow rate of gas blown into the flame reactor, the pressure of the dispersed air introduced into the first tube of the burner was maintained constantly at 3.0 kgf/cm², which is 1% to 2% in volume of the entire flow rate of gas, in order to make a TEOS reactive material into fine droplets having molarities of $2.1 \times 10^{-4}$ mol/l, $3.3 \times 10^{-4}$ mol/l and $4.8 \times 10^{-4}$ mol/l. In addition, Ar gas at 7% in volume fraction was blown into the second tube 22, hydrogen gas at 14% in volume fraction was blown into the third tube 23, oxygen gas at 21% in volume fraction was blown into the fourth tube 24, and air at 56% to 57% in volume fraction was blown into the fifth tube 25. With these conditions, silica nanoparticles were produced.

FIG. 4 illustrates TEM photographs of nanoparticles produced under the above experimental conditions according to the invention, where the pressure of dispersed air was fixed and the input of reactive material was (a) $2.1 \times 10^{-4}$ mol/l, (b) $3.3 \times 10^{-4}$ mol/l and (c) $4.8 \times 10^{-4}$ mol/l. Referring to FIG. 4, it is apparent that all types of particles in (a) to (c) show a substantially spherical geometry and the particle size increases as the input of the reactive material increases.

Examining changes in the specific surface area and size of resultant particles, the specific surface area decreased from 113 m²/g to 51 m²/g with the input of reactive material increasing, and the mean particle size increased from 24 nm to 54 nm.

EXAMPLE 3

Example 3 was aimed to adjust the size of resultant particles by adjusting the flow rate of hydrogen gas used as fuel to 3% in volume fraction and then changing the flow rate of a TEOS reactive material.

Describing the flow rate of gas blown into the flame reactor, the pressure of the dispersed air introduced into the first tube of the burner was maintained constantly at 3.0 kgf/cm², which is 2% in volume of the entire flow rate of gas, in order to make the TEOS reactive material into fine droplets having molarities of $2.1 \times 10^{-4}$ mol/l, $3.3 \times 10^{-4}$ mol/l and $4.8 \times 10^{-4}$ mol/l. In addition, Ar gas at 8% in volume fraction was blown into the second tube 22, hydrogen gas at 3% in volume fraction was blown into the third tube 23, oxygen gas at 24% in volume fraction was blown into the fourth tube 24, and air at 63% in volume fraction was blown into the fifth tube 25. With these conditions, silica nanoparticles were produced.

FIG. 5 illustrates TEM photographs of nanoparticles produced under the above experimental conditions according to the invention, where the pressure of dispersed air was fixed to 3.0 kgf/cm² and the input of reactive material was (a) $3.7 \times 10^{-4}$ mol/l, (b) $6.2 \times 10^{-4}$ mol/l and (c) $8.7 \times 10^{-4}$ mol/l. Referring to FIG. 5, it is apparent that all types of particles in (a) to (c) show a substantially spherical geometry and the particle size increases as the input of the reactive material increases.

Examining changes in the specific surface area and size of resultant particles, the specific surface area decreased from 150 m²/g to 87 m²/g as the input of the reactive material increases, and the mean particle size increased from 18 nm to 32 nm.

EXAMPLE 4

Example 4 was aimed to produce silica nanoparticles by substituting TMOS for TEOS, which was used as the reactive material in the production of the nanoparticles.

Describing the flow rate of gas blown into the flame reactor, the pressure of the dispersed air introduced into the first tube of the burner was maintained constantly at 3.0 kgf/cm², which is 2% in volume of the entire flow rate of gas, in order to make the TMOS reactive material into fine droplets having a molarity of $5.0 \times 10^{-4}$ mol/l. In addition, Ar gas at 7% in volume fraction was blown into the second tube 22, hydrogen gas at 14% in volume fraction was blown into the third tube 23, oxygen gas at 21% in volume fraction was blown into the fourth tube 24, and air at 56% in volume fraction was blown into the fifth tube 25.

FIG. 6 illustrates TEM photographs of nanoparticles produced under the above experimental conditions according to the invention. Referring to FIG. 6, it is apparent that the particles show a substantially spherical geometry and the particle size is 51 nm.

According to the method for making silica nanoparticles by flame spray pyrolysis of the invention, a droplet spray having a two-fluid nozzle and a burner of a quintuple tube structure are used to change the pressure of dispersed air, the input of reactive solution and the flow rate hydrogen gas in a reactive system of TEOS (or TMOS)-alcohol-Ar-$H_2$-$O_2$-air in order to controllably produce silica nanoparticles having a mean particles size of 9 nm to 68 nm. This also provides design sources for a reactor for mass production of such silica nanoparticles.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for making silica nanoparticles using a flame reactor, which includes a droplet spray having a two-fluid nozzle and a burner of a quintuple tube structure, the method comprising the steps of:
    spraying droplets of silicon alkoxide as liquid Si compound through the two-fluid nozzle of the flame reactor;
    generating a flame by the flow of inert gas, oxygen, hydrogen and air simultaneously into the quintuple tube structure of the flame reactor;
    delivering the liquid Si compound through the flame of the burner to produce spherical silica nanoparticles having a mean particle size ranging from 9 nm to 68 nm; and
    collecting and recovering resultant nanoparticles in a particle collector.

2. The method according to claim 1, wherein the droplet spray is inserted into an innermost first tube of quintuple tubes of the burner, and wherein dispersed air at 1% to 3% in volume of the entire flow rate of gas is blown into the droplet spray, by which silicon alkoxide introduced into the droplet spray is sprayed in the form of fine droplets under high pressure, Ar gas at 7% to 8% in volume of the entire flow rate of gas is blown into the second tube, hydrogen gas at 3% to 13% in volume of the entire flow rate of gas is blown into the third tube, oxygen gas at 21% to 23% in volume of the entire flow rate of gas is blown into the fourth tube, and air at 53% to 62% in volume of the entire flow rate of gas is blown into the fifth tube.

3. The method according to claim 2, wherein the amount of silicon alkoxide is varied from $2.1 \times 10$ mol/l to $8.7 \times 10^{-4}$ mol/l of the entire flow rate of gas to control the mean size of the silica nanoparticles.

4. The method according to claim 2, wherein the pressure of the dispersed air is varied from 1.0 kgf/cm$^2$ to 5.0 kgf/cm$^2$ to control the mean size of the silica nanoparticles.

5. The method according to claim 2, wherein the silicon alkoxide is pretreated through thinning with ethanol or methanol prior to being sprayed by the droplet spray.

6. The method according to claim 1, wherein the amount of silicon alkoxide is varied from $2.1 \times 10$ mol/l to $8.7 \times 10^{-4}$ mol/l of the entire flow rate of gas to control the mean size of the silica nanoparticles.

7. The method according to claim 1, wherein the silicon alkoxide is pretreated through thinning with ethanol or methanol prior to being sprayed by the droplet spray.

8. A method for making silica nanoparticles using a flame reactor, which includes a droplet spray having a two-fluid nozzle and a burner having a quintuple tube structure, the method comprising the steps of:

generating a flame by the flow of inert gas, oxygen, hydrogen and air simultaneously into the quintuple tube structure of the burner;

passing silicon alkoxide as liquid Si compound through the two-fluid nozzle of the droplet spray to deliver the liquid Si compound through the flame of the burner, thereby producing spherical silica nanoparticles having a mean particle size ranging from 9 nm to 68 nm; and collecting and recovering resultant nanoparticles in a particle collector.

9. The method according to claim 8, wherein the droplet spray is inserted into an innermost first tube of quintuple tubes of the burner, and wherein dispersed air at 1% to 3% in volume of the entire flow rate of gas is blown into the droplet spray, by which silicon alkoxide introduced into the droplet spray is sprayed in the form of fine droplets under high pressure, Ar gas at 7% to 8% in volume of the entire flow rate of gas is blown into the second tube, hydrogen gas at 3% to 13% in volume of the entire flow rate of gas is blown into the third tube, oxygen gas at 21% to 23% in volume of the entire flow rate of gas is blown into the fourth tube, and air at 53% to 62% in volume of the entire flow rate of gas is blown into the fifth tube.

10. The method according to claim 9, wherein the amount of silicon alkoxide is varied from $2.1 \times 10$ mol/l to $8.7 \times 10^{-4}$ mol/l of the entire flow rate of gas to control the mean size of the silica nanoparticles.

11. The method according to claim 9, wherein the pressure of the dispersed air is varied from 1.0 kgf/cm$^2$ to 5.0 kgf/cm$^2$ to control the mean size of the silica nanoparticles.

12. The method according to claim 9, wherein the silicon alkoxide is pretreated through thinning with ethanol or methanol prior to being sprayed by the droplet spray.

13. The method according to claim 8, wherein the amount of silicon alkoxide is varied from $2.1 \times 10$ mol/l to $8.7 \times 10^{-4}$ mol/l of the entire flow rate of gas to control the mean size of the silica nanoparticles.

14. The method according to claim 8, wherein the silicon alkoxide is pretreated through thinning with ethanol or methanol prior to being sprayed by the droplet spray.

* * * * *